Oct. 18, 1966  W. E. ELDRED  3,279,278
TENSION-TORSION TIE-BAR AND END FITTINGS THEREFOR
Original Filed April 24, 1964  4 Sheets-Sheet 2
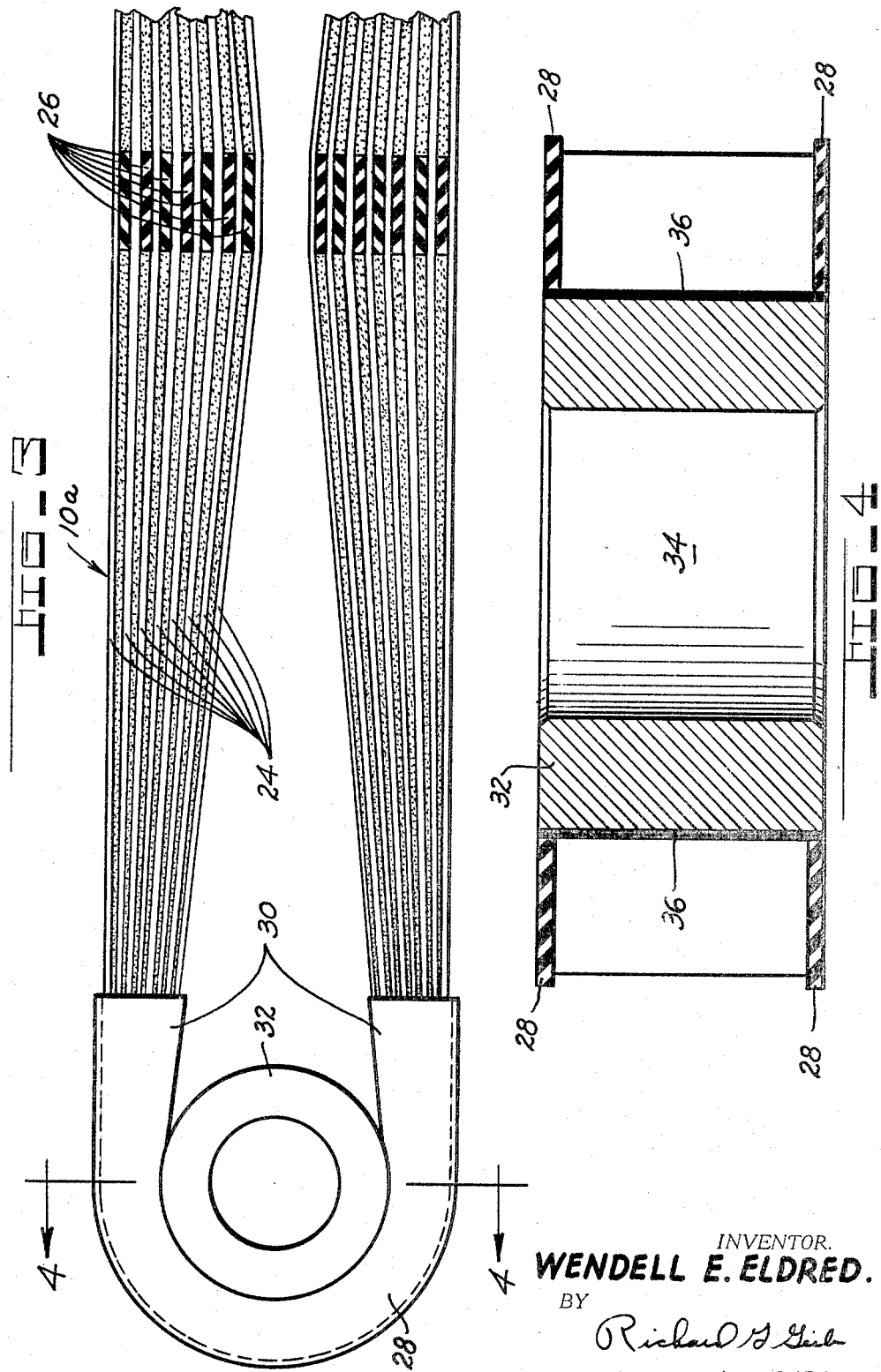
INVENTOR.
WENDELL E. ELDRED.
BY
Richard G. Gieb
ATTORNEY Oct. 18, 1966 W. E. ELDRED 3,279,278
TENSION-TORSION TIE-BAR AND END FITTINGS THEREFOR
Original Filed April 24, 1964
4 Sheets-Sheet 3
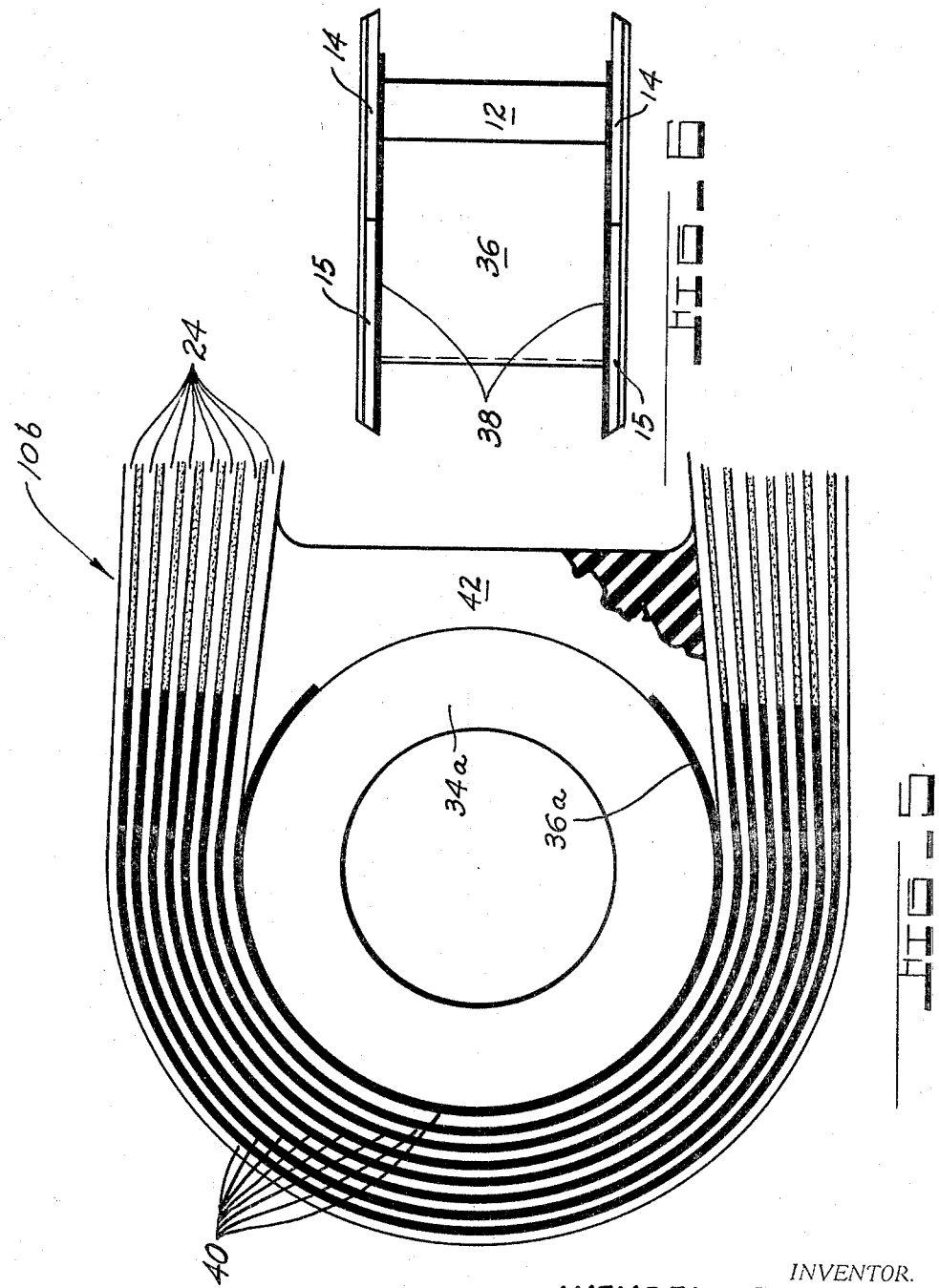
INVENTOR.
WENDELL E. ELDRED.
BY
*Richard J Gibb*
ATTORNEY.

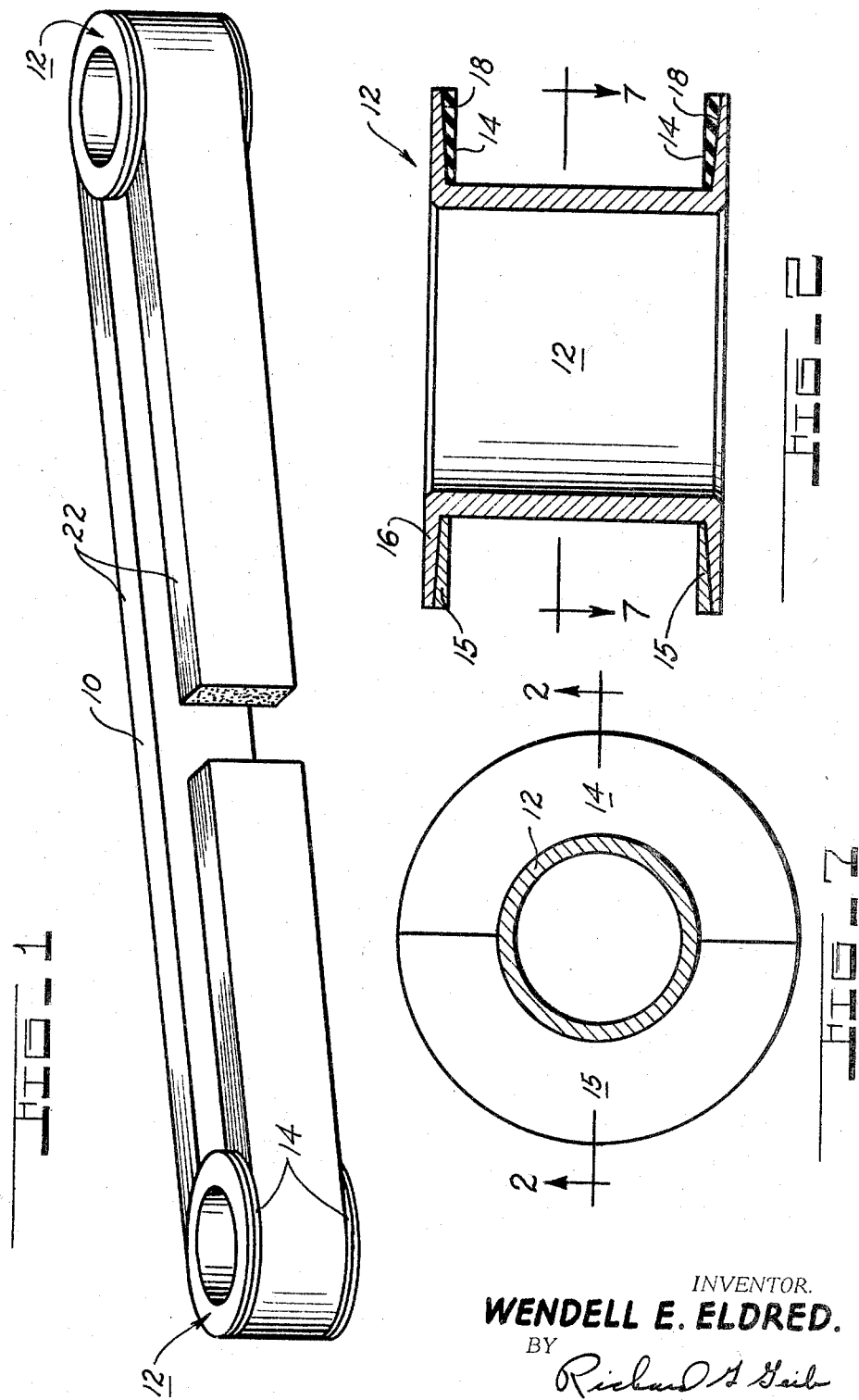

Oct. 18, 1966 W. E. ELDRED 3,279,278
TENSION-TORSION TIE-BAR AND END FITTINGS THEREFOR
Original Filed April 24, 1964
4 Sheets-Sheet 4
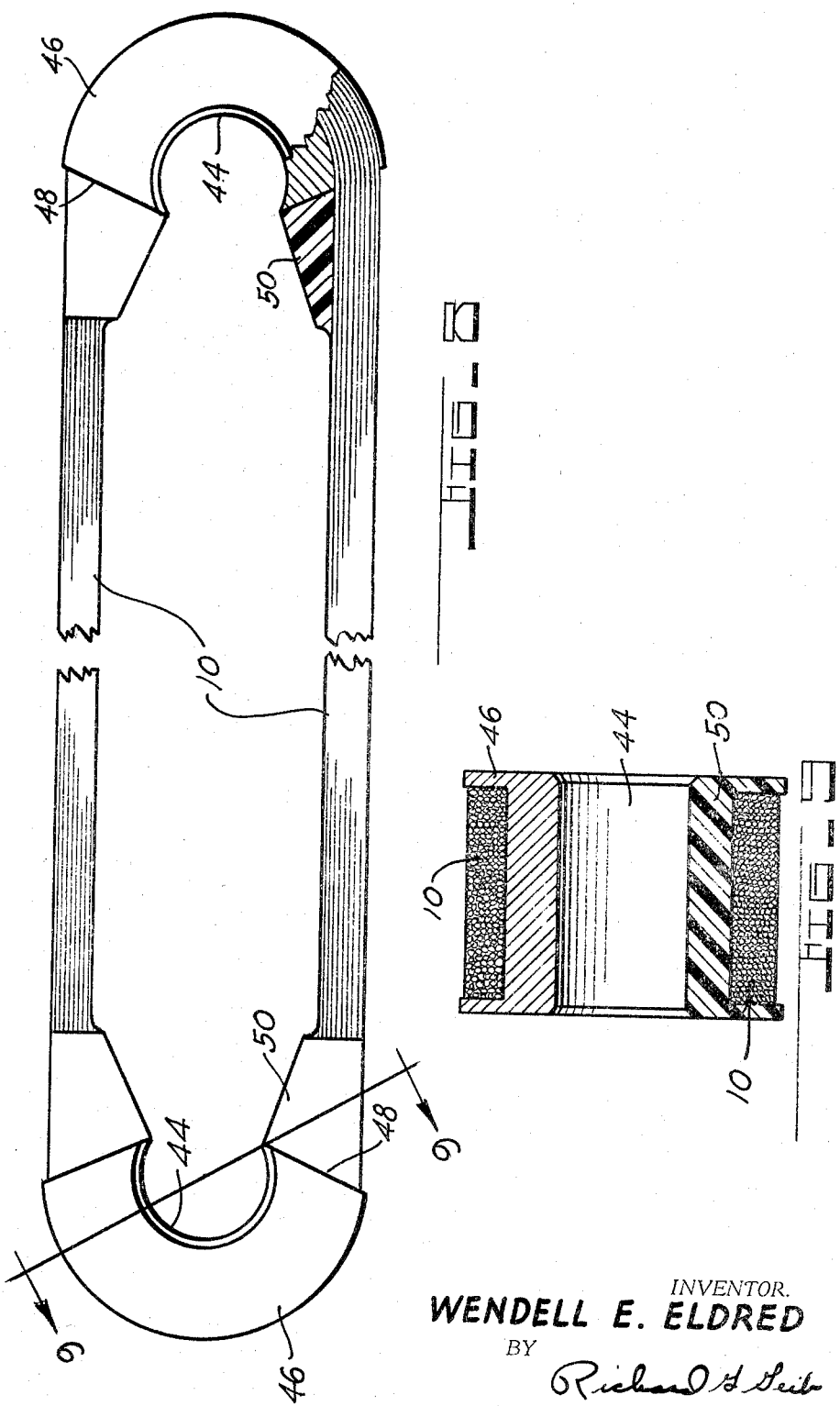
INVENTOR.
WENDELL E. ELDRED
BY
ATTORNEY.

United States Patent Office 3,279,278
Patented Oct. 18, 1966

3,279,278
TENSION-TORSION TIE-BAR AND END FITTINGS THEREFOR
Wendell E. Eldred, South Bend, Ind., assignor to The Bendix Corporation, South Bend, Ind., a corporation of Delaware
Original application Apr. 24, 1964, Ser. No. 362,511, now Patent No. 3,228,481. Divided and this application June 1, 1965, Ser. No. 460,180
10 Claims. (Cl. 74—579)

This invention relates to improvements in tie-bar construction, and is a division of application Serial No. 362,-511 filed April 24, 1964, now Patent No. 3,228,481.

The invention relates more particularly to a connecting tie-bar and its manner of connection with structures to resist tensile and torsional loads as may be applied to at least one of said structures.

It is accordingly an object of this invention to provide an elastomer encased filament tie-bar having similar stress levels in all layers of the laminations thereof.

It is another object to provide a laminated filament structure encased by an elastomer and separated centrally by a resilient substance to equalize stress levels in each of the laminations.

It is also an object to provide a connecting means for the tie-bar having provisions to reduce localized stress concentration.

Still another object is to construct a tie-bar in such a manner as to minimize localized stress concentration not only attributable to connecting means for the tie-bar, but to surrounding structure as well.

Other and further objects will be readily appreciated by those skilled in the art from the following description and drawings in which:

FIGURE 1 is a diametric view of a tie-bar employing fitting structures according to the present invention;

FIGURE 2 is a sectional view such as along line 2—2 of FIGURE 7 of a flanged bushing designed in accordance with one aspect of the present invention;

FIGURE 3 is a plan view of a tie-bar constructed in accordance with the present invention;

FIGURE 4 is a sectional view along line 4—4 of FIGURE 3 of a modified bushing designed in accordance with the present invention;

FIGURE 5 is a plan view of a modified form of tie-bar and bushing arrangement;

FIGURE 6 is a side view of a flanged end fitting having all the various additions suggested by the subject invention;

FIGURE 7 is a sectional plan view such as along line 7—7 of FIGURE 2 of a bushing showing the modifications to the flanges thereof according to the subject invention;

FIGURE 8 is a plan view of another modification of my tie-bar; and

FIGURE 9 is a section taken along line 9—9 of FIGURE 8 showing my end connection for the tie-bar depicted by FIGURE 8.

Industry in general has long been in need of a lightweight connection capable of transmitting high tensile and torsional loadings between two structures. In particular, the helicopter industry has been in need of a lightweight tie-bar 10 for connecting rotor blades 11 to a rotor hub 13. Such a connection has been designed to appear as that presented in FIGURE 1, which is the subject matter of a copending application Serial No. 150,455 assigned to a common assignee, and this structure includes an elastomer encased filament laminated tie-bar 10 having end fittings 12 for attaching it to the structures such as blades 11 and hub 13 to be joined thereby, and in particular in one instance to a rotor blade root and rotor hub arm through appropriate pin connections therewith as per the above application.

However, as the tie-bar 10 was subjected to torsional loads, it was brought to bear, in a decidedly concise area, upon surrounding structure, such as the end fitting flanges.

I have found that the deleterious stresses were obviated by bonding an elastomeric or other resilient ring 14 to the undersurface of the flanges 16. In more detail, with reference to FIGURE 2, an enlarged view of an end fitting 12 is shown having flanges 16 and a substance 14 associated with the flanges 16. The substance 14 will be bonded to surface 18 by any number of methods, such as, for example, by dipping or by cementing individual molded washers in place, and thereafter simply machined to present the normal surface shown in FIGURE 2.

Tests for such a structure have shown a marked reduction of localized stress concentration attributable to the end fittings 12. I have further discovered that such a stress concentration was due primarily to the bearing of the tie-bar 10 on the flanges where the tie-bar emerges from the end fitting 12, and that in areas where the tie-bar wraps around the fitting it does not need such a substance 14. Therefore, an end fitting 12 was modified to bond a semi-circular ring of substance 14 and a semi-circular metal ring 15 to the tapered surface 18. In this form, the semi-circular metal ring 15 was placed to be above and below the tie-bar in the area where said tie-bar wrapped around end fitting 12. This modification has been determined to reduce possibility of extrusion of the substance 14 between the tie-bar 10 and the flanges of the end fitting 12. In other words, the higher bearing strength and modulus of elasticity of the metal ring in the critical load region is sufficient to resist extrusion of the ring between the bushing and tie-bar.

I have also determined that under normal loadings the innermost elastomer encased filament laminations of the tie-bar 10 in the area 22 as seen in FIGURE 1 were undergoing greater loading than the outer laminations. Such a load pattern has been materially reduced by spacing the elastomer encased filament laminations 24 by shims 26 as seen in FIGURE 3. These shims could be tapered to be thickest at the middle and diminish towards the ends, and these shims would be inserted into the elastomer encased filament laminations to extend between the end fittings. This construction, however, is not shown in view of the clearer picture presented by showing simply a shim inserted in the mid-area of the tie-bar as depicted by FIGURE 3. With this construction, i.e., tie-bar laminations 24 centrally separated by shims 26, the load pattern in the laminations 24 has been equalized to a greater extent than heretofore possible. This load pattern is created by the fact that the inner and outer filament lengths have been equalized by progressively increasing the filament lengths of the inner filament lamination to match that of the peripheral lamination.

In order to prevent direct bearing of the tie-bar 10 on surrounding structure such as that which is joined by said tie-bar, I provide a bushing of the type shown by FIGURES 3 and 4 having a cushioning substance 28 with trailing extensions 30 projecting a trailing envelope of bearing protection for the tie-bar 10a.

As may be more readily seen in FIGURE 4, the bushing 32 does not have radiating flanges as with the end fittings 12. Instead, the cushioning substance 28 is molded and cemented or cast to bond with a body 34 and then machined to give radiating flanges of substance 28 which trail off from said body 34 in the form of extensions 30 with the flanges and extensions united by a shell portion 36, said shell portion 36 being integrally bonded with the body 34 and extensions 30, and shell 36 is herein shown as cylindrical for purposes of illustration only.

The extensions 30 could also be adapted to the substance 14 to extend the flanges 16 of the end fittings 12 to further reduce the possibility that the tie-bar 10 will contact surrounding structure.

The shell 36 is preferably made of a plastic substance with a low coefficient of friction such as a fluorocarbon. In addition the shell 36 could be formed with bushings 34 and 12 to substantially cover the central body as in FIGURES 5 and 6, which as shown is placed about said bushings in such a manner that it forms a bearing layer for the laminated tie-bar that is to be wrapped therearound. In addition to this shell 36 is preferably treated on one side to bond with the body of the end fittings 34 and 12.

In addition it has been found that a fluorocarbon ring 38 can be a practical addition to a flanged bushing such as depicted by FIGURE 6 wherein said ring 38 is treated on one side, as was the shell, to bond it to the semicircular metal and elastomeric rings 15 and 14, respectively. This further minimizes the effect of the tie-bar on the metal and elastomeric shear by creating a bearing layer for said rings 15 and 14 to minimize bond shear stresses and to prevent chafing or fretting corrosion.

As seen in FIGURE 5, a bushing body 34a is bonded to the shell 36a. The tie-bar 10b is modified to have layers 40 of a plastic substance with a low coefficient of friction such as a fluorocarbon interleaved with the filament reinforced laminations 24 in the area of high loading on the body 34; i.e. the area of load transmission to the tie-bar 10b. The layers 40 could be formed to provide a continuous shim for the tie-bar laminations 24.

With such a construction as presented by bonding the fluorocarbon substance 36 to the body of an end fitting as above and/or the interleaving of the fluorocarbon substance 40 with the elastomer encased filament laminations also as above, a more uniform stress distribution is brought about. In fact, it has been found that such a construction brings about a stress compensation by affording some compensation for combined stresses on the inner elastomer encased filament lamination surrounding the bushing, which are a combination of shear, tensile, and compressive stresses.

As seen in FIGURE 5, a rubber or similar type filler block 42 is bonded to the bushing 34a and to the innermost laminations 24 of the tie-bar 10b. This filler block is designed to be thick enough to not effect stress distribution in the tie-bar and at the same time afford sufficient flexibility. The block 42 functions to prevent rotating of the end fitting which could place the metal and elastomeric rings out of their proper position, and it would serve to take moderate compressive loads.

It is to be understood that the fluorocarbon layers 40 as well as the shims 26 could be supplied in any number and could conceivably create a different spacing of the elastomer encased filament laminations especially in such cases where the stress distribution in the laminations may not be linear.

A still further form which my invention may take is shown by FIGURES 8 and 9. In detail, I have shown the tie-bar 10 to be joined at each end to a pair of bushings 44 having flanges 46 cut away as at 48. In order to protect the tie-bar from impinging on structure above and below it as well as preventing twisting of the bushing 44, I have molded a pair of elastomeric or plastic pieces 50 between the parallel strands of the tie-bar and over them to lie flush with the upper and lower surface of the flanges 46 as seen in FIGURE 9. This could be a solid block as in FIGURE 5 but does not have to be in the interests of saving weight.

By cutting away, as at 48, the front half of the flange 46, I have eliminated flange cracking and by using a diagonal cut, as shown, have allowed for the use of my tie-bar in compression loading at a substantial weight saving. More particularly, as I have provided a nearly complete inner surface for bushing 44 receiving a pin (not shown) to join the tie-bar to surrounding structure, compression loading will be transmitted from the bushings 44 through the elastomeric or plastic filler structure 50 to be transmitted by the shear bond betwen the block 50 and the tie-bar 10.

Having described my invention above, it is my intent, however, to claim such invention not only as described, but also in all those forms and variations as may be reasonably construed to be within the spirit of the invention and within the scope of the appended claims.

I claim:
1. A coupling comprising:
    end fittings;
    a lamination of filament layers being enclosing said end fittings in an open center structure with said end fittings in spaced relation towards each end of said lamination; and
    an elastomeric means adjacent each end fitting and bonded to said lamination and said end fittings to join said lamination to said end fittings while preventing rotation of said end fittings in said laminations, said elastomeric means providing for compressive load transmission, to said end fittings via said laminations and enclosing said laminations preventing contact between said laminations and surrounding structure.

2. A coupling comprising:
    a pair of end fittings having a central apertured body and spaced flanges which are diagonally cut back from one side to partially open said body;
    a lamination of filment layers being adapted to enclose said end fittings and maintain said end fittings in spaced relation towards each end of said lamination; and
    an elastomeric means joining said lamination to said end fittings adjacent said apertured body to have an upper and lower surface level with said flanges which surface abuts the diagonal cut of the flanges.

3. Means for resisting high tensile stresses while permitting torsional flexure comprising:
    flanged end fittings having a central body;
    a fluorocarbon shell partially enclosing said body;
    an elastomeric means bonded to said flanges; and
    a tier-bar formed of elastomeric encased high strength parallelly arranged filament laminations wrapped around said end fittings on said fluorocarbon shell, said tie-bar being bonded to said elastomeric means to transmit compressive loadings to said end fittings in shear.

4. Means for resisting high tensile stresses while permitting repeated torsional flexure comprising:
    flanged end fittings having a central body;
    a fluorocarbon shell partially enclosing said body;
    a semi-circular elastomeric means bonded to said flanges to form with said flanges an even surface; and
    a tie-bar encirculing said end fittings and joined with said elastomeric means to transmit compression loads in said tie-bar to said end fittings, said tie-bar being enveloped by said elastomeric means to protect it from surrounding structure.

5. A means for resisting high tensile stresses while permitting repeated torsional flexure comprising:
    end fittings, including a cylindrical, apertured body, a pair of flanges extending from each end of said body, and a cushioning substance bonded to the flanges;
    a fluorocarbon shell bonded to said end fittings on said cylindrical, apertured body; and
    an annular tension-torsion tie-bar formed of elastomer encased filament laminations, which tie-bar is operatively connected to said cushioning substance of said end fittings to join said end fittings in an annular structure having an open center section with said annular tension-torsion tie-bar arranged adjacent said fluorocarbon shell whereby limited slippage between said tie-bar and said end fittings may be effected by application of loads to said tie-bar without varying the stress level in the innermost filament laminations as respects the outermost filament laminations.

6. Means for resisting high tensile stresses while permitting repeated torsional flexure comprising:
    flanged end fittings having a central body;
    elastomeric rings bonded to said flanges to form a cushioning body;
    fluorocarbon rings bonded to said elastomeric rings to form a low coefficient of friction bearing layers; and
    a tie-bar formed of elastomer encased high strength filament laminations, which tie-bar is wrapped about said end fittings to join said end fittings in an elongated ring structure, said tie-bar being confined between said fluorocarbon rings on said flange of said end fittings.

7. Means for resisting high tensile stresses while permitting repeated torsional flexure comprising:
    flanged end fittings having a central body;
    a semi-circular metallic ring bonded to said flanges;
    a semi-circular elastomeric ring bonded to said flanges to form with said metallic ring an even surface;
    a fluorocarbon ring bonded to said metallic and elastomeric rings to form a low coefficient of friction bearing layer; and
    a tie-bar formed of elastomer encased high strength filament laminations, which tie-bar is wrapped about said end fittings to join said end fittings in an elongated ring structure, said tie-bar being vertically confined by said fluorocarbon ring on said flange of said end fittings.

8. Means for resisting high tensile stresses while permitting repeated torsional flexure comprising:
    flanged end fittings having a central body;
    a fluorocarbon shell partially enclosing said body;
    a semi-circular metallic ring bonded to said flanges;
    a semi-circular elastomeric ring bonded to said flanges to form with said metallic ring an even surface;
    a fluorocarbon ring bonded to said metallic and elastomeric rings to form a low coefficient of friction bearing layer; and
    a tie-bar formed of elastomer encased high strength filament laminations, which tie-bar is wrapped about said end fittings to join said end fittings in an elongated ring structure, said tie-bar being vertically confined by said fluorocarbon ring on said flange of said end fittings.

9. Means for resisting high tensile stresses while permitting repeated torsional flexure comprising:
    flanged end fittings having a central body;
    a fluorocarbon shell partially enclosing said body;
    a semi-circular metallic ring bonded to said flanges;
    a semi-circular elastomeric ring bonded to said flanges to form with said metallic ring an even surface;
    a fluorocarbon ring bonded to said metallic and elastomeric rings to form a low coefficient of riction bearing layer;
    a tie-bar formed of elastomer encased high strength filament laminations, which tie-bar is wrapped about said end fittings to join said end fittings in an elongated ring structure; and
    an elastomeric means bonded to the body of said end fittings and to said tie-bar to prevent rotation of said end fittings.

10. Means for resisting high tensile stresses while permitting repeated torsional flexure comprising:
    end fittings;
    an annular tie-bar formed of elastomer encased filament laminations wrapped around said end fittings to form a structure having rounded ends joined by substantially parallel sides; and
    a plurality of ring-shaped shims interleaved with the filament laminations, said shims being formed of continuous resilient layers of a fluorocarbon substance being of minimum thickness towards the rounded ends and of maximum thickness intermediate said ends.

References Cited by the Examiner
UNITED STATES PATENTS 1,676,333    7/1928    Kattiwinkel _____ 64—12

FRED C. MATTERN, Jr., *Primary Examiner.*

W. S. RATLIFF, Jr., *Assistant Examiner.*